Feb. 21, 1956 J. A. PERRY 2,735,500
HELICOPTER ROTOR STRUCTURE
Filed Aug. 3, 1953 2 Sheets-Sheet 1
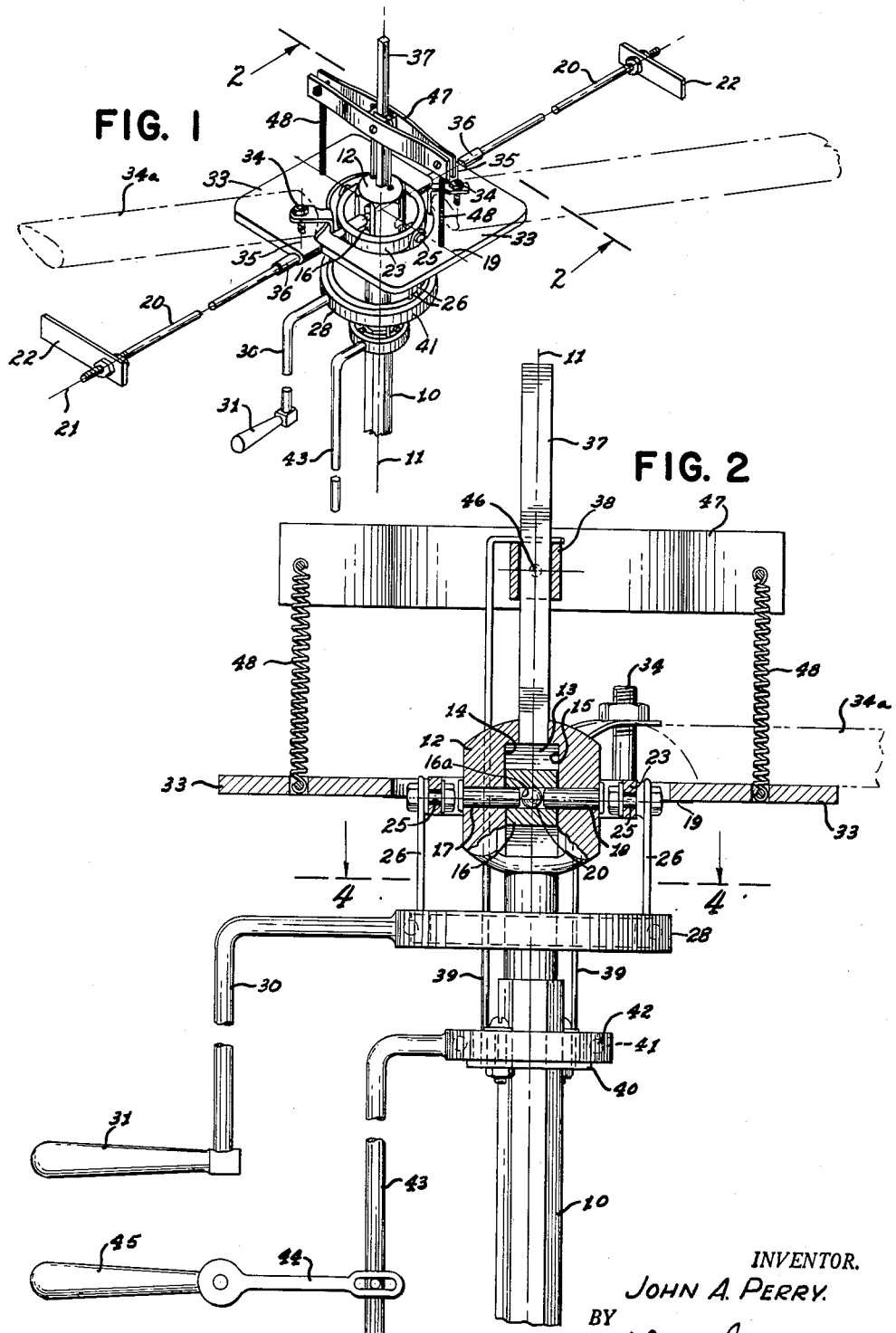
INVENTOR.
JOHN A. PERRY.
BY
Willard S. Grow
ATTORNEY Feb. 21, 1956  J. A. PERRY  2,735,500
HELICOPTER ROTOR STRUCTURE
Filed Aug. 3, 1953  2 Sheets-Sheet 2
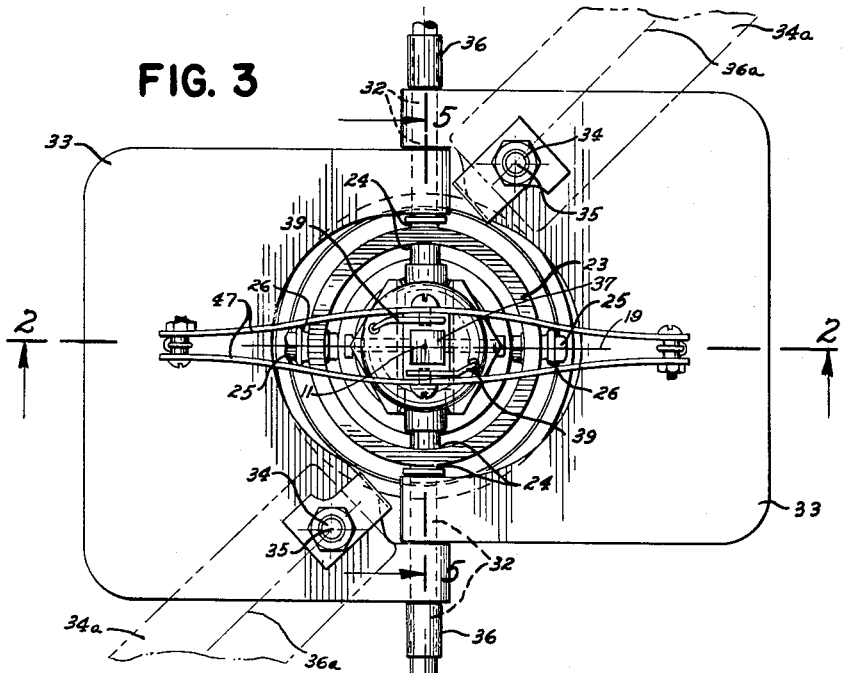
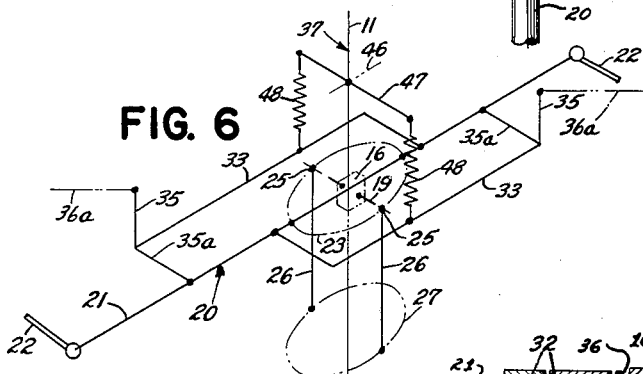
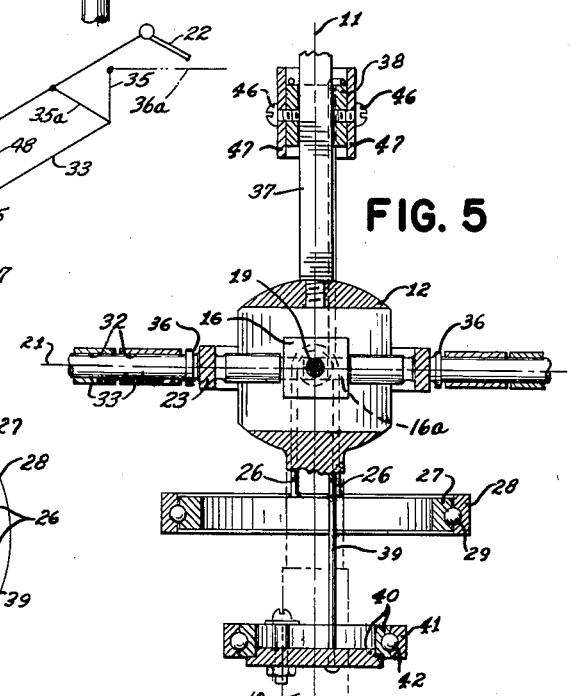
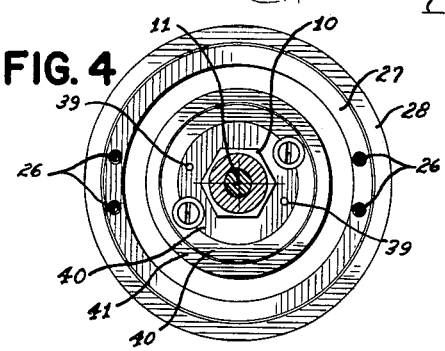
INVENTOR.
JOHN A. PERRY.
BY
Willard S. Grant
ATTORNEY

United States Patent Office 2,735,500
Patented Feb. 21, 1956

2,735,500

HELICOPTER ROTOR STRUCTURE

John A. Perry, Phoenix, Ariz.

Application August 3, 1953, Serial No. 372,043

8 Claims. (Cl. 170—160.25)

This invention pertains to improvements in aeroplane lift sustaining structures and is more particularly directed to improved helicopter rotor structure.

One of the objects of this invention is to provide an improved helicopter rotor structure which is easy to control and automatic in its operation in controlling the lift and direction of movement of the helicopter.

Still another object of this invention is to provide an improved arrangement for automatically tilting the blades of a helicopter rotor at predetermined rotary positions of the blades relative to the fuselage of the helicopter.

Still another object of this invention is to provide a simplified and easily manipulated control for tilting the blades of a helicopter rotor at predetermined positions of rotation.

Still another object of this invention is to provide means for resiliently interconnecting the helicopter blades and to vary the resilient effect on said blades for varying their angle of attack in the disc of rotation of said helicopter rotor blades.

Further features and advantages of this invention will appear from a detailed description of the drawings in which:

Fig. 1 is a top perspective view of a helicopter rotor structure incorporating the features of this invention.

Fig. 2 is a vertical section on the line 2—2 of Figs. 1 and 3.

Fig. 3 is a plan view of the apparatus shown in Fig. 1.

Fig. 4 is a section on the line 4—4 of Fig. 2.

Fig. 5 is a section on the line 5—5 of Fig. 3.

Fig. 6 is a diagram of the essential axes of movement of the elements of the device.

As illustrative of one embodiment of this invention there is shown a helicopter rotor structure having the drive shaft 10 which is rigidly supported in the fuselage of the helicopter and suitably journaled for rotation about the vertical axis 11, the drive shaft 10 being driven by the usual main drive motor (not shown) customarily used for such aircraft. The drive shaft 10 is formed with a head 12 having a radially disposed slot 13 having side faces 14 and 15 between which nicely fits the block 16 which in turn is pivotally mounted on trunnion pins 17 and 18 defining an axis 19 of pivotal movement which axis 19 is diametrically disposed at right angles to the axis of rotation 11 of the drive shaft 10.

Journaled in the block 16 in a suitable bearing bore 16a is the transverse shaft 20 extending radially either side of and confined against axial movement in the block 16 which defines an axis 21 diametrically disposed relative to the axis of rotation 11 of the drive shaft 10 and at right angles to the axis 19 of pivoting of the block 16 in the head 12 of the drive shaft 10. The adjustable counterweights 22 may be mounted on the outer ends of the transverse shaft 20 for the purpose of adjusting the proper tracking of the blades in the same disc of rotation.

Fixed to the transverse shaft 20 and surrounding the head 12 of the drive shaft 10 is the cyclic or direction pitch control element of the rotor structure which comprises the first ring 23 rigidly secured to the shaft 20 as by welding at 24. Studs 25 are mounted in the first ring 23 on an axis located at right angles to the axis 21 of the transverse shaft 20. Downwardly extending control rods 26 are journaled for rocking motion on the studs 25 of the ring 23 and terminate at their lower ends in fixed relationship to the inner ring 27. An outer ring 28 is connected by anti-friction ball-bearing means 29 to the inner ring 27 and a suitable control lever 30 having the operating handle 31 is fixed to the outer ring 28 so that the outer ring 28 is non-rotating upon rotation of the drive shaft 10 but which outer ring 28 may be moved to any desired angular position relative to the axis 11 of the main drive shaft 10 and similarly manipulate the rotating inner ring 27 of the rotor structure so as to in turn reposition the control ring 23 in the desired positions from the cyclic control handle 31.

Pivotally mounted on the transverse shaft 20 on suitable bearings 32 are the blade supporting hinge members 33 to which are fastened the rotor blades 34-a by means of the mounting bolts 34 defining an axis of pivoting 35 on the hinge members 33. The clamping bolts 34 may be arranged to allow restricted frictional pivoting of the blades 34-a on the hinge members 33 if desired or the blades 34-a may be locked in desired angular position of their axes 36 relative to the axis 21 of the transverse shaft 20. Suitable thrust collars 36 fixed on the shaft 20 serve to properly position the blade hinge members 33 axially of the shaft 20.

Slidably mounted on the reduced upper extension 37 of the drive shaft 10 fixed in the top of the head 12 thereof is the yoke support member 38. The member 38 is controlled in its axial position on the extension 37 by the control rods 39 which are rigidly secured to the yoke support member 38 and terminate at their lower ends in fixed engagement with the inner ring 40 which in turn is slidably mounted on and rotates with the drive shaft 10. An outer ring 41 is connected through anti-friction bearing means 42 so that the outer ring 41 may remain non-rotating upon rotation of the drive shaft 10 while at the same time can axially shift the inner ring 40 the control rods 39 and thus change the relative axial position of the yoke support member 38 on the extension 37. A suitable control arm 43 connected to the control lever 44 having the collective pitch control handle 45 serves to provide manual means for vertically reciprocating the yoke support member 38.

Pivotally mounted on suitable trunnion screws 46 is the yoke 47 which has its outer ends connected through open coil tension springs 48 with the hinge members 33. By raising and lowering the yoke 47 by axially shifting the yoke support member 38 more or less tension may be provided by the yielding means comprising the open coil springs 48 to simultaneously increase or decrease the pitch of both blades independent of any relative position of rotation of the blades about the drive shaft 10 and the axis 11. Thus, by manipulating the collective pitch control handle 45, the aircraft as a whole may rise or fall vertically as desired. Manipulation of the cyclic control handle 31 provides means for changing the direction of movement of the craft by changing the pitch of the blades at a particular circumferential position around the axis 11 of the drive shaft 10.

Referring particularly to Fig. 6, the shaft 20 has three separate and distinct movements. First, the shaft 20 revolves at its mid point about the axis 11.

Secondly, the shaft 20 oscillates around the axis 21. If the ring 27 is held off-center relative to the axis 11 while revolving around the axis 11, it will cause the ring 23, shaft 20, and counterweights 22 to oscillate around the axis 21. The degree of oscillation is controlled by the degree the ring 27 is held off-center from the axis 11. There is one complete oscillation of the shaft 20 per one revolution of the vertical shaft 37.

Thirdly, oscillatory movement around axis 19 is caused by precession which results in one complete oscillation around axis 19 per one revolution of the shaft 37.

The blades 34a are mounted above 35 and to the rear 35a relative to direction of rotation of the axis 21 in a manner as recited in the aforementioned Patent 2,684,722 and in my Patent 2,684,122 issued July 20, 1954. When the rotor and blades are in rotation about the axis 11 the centrifugal force tends to hold the blades in definite plane of rotation. Should the ring 27 be displaced from its concentric position around axis 11, the shaft 20 will oscillate around the axis 21, this in turn due to precession which will cause shaft 20 to oscillate around the axis 19.

Since the tips of the blades are held by centrifugal force in a plane of rotation and the shaft 20 oscillates around axis 19, this in turn changes the angle of attack of the blades. As a result there is a definite and positive controlled cyclic action of the blades, and the blades are free to revolve around shaft 20 and relieve excess and unwanted forces such as caused by up and down drafts encountered in flight.

If the ring 23 has sufficient mass as it oscillates around axis 21 and will produce sufficient power to oscillate shaft 20 around the axis 19, it is unnecessary for shaft 20 to oscillate about the axis 21. However, it is preferred to have a shaft 20 or mass oscillating because first of all the shaft or mass adds to the precessional action and adds stability and dampens oscillation around axis 19. Secondly, if the shaft does not turn around axis 21 the friction between the hinge members 33 and the shaft 20 would tend to interfere with the cyclic action of the blades. And thirdly, the shaft 20 or mass controls oscillations of the counterweights 22.

The weights 22 serve three important purposes. By revolving weights, excentrically mounted relative to the axis 21, the longitundial axis of the center of gravity of the entire assembly comprising the ring 23, the shaft 20, and the weights 22 may be changed in relation to the axis 19. Thus the blades can be tracked and the blades will travel in the same plane. The weights 22 add stability by damping the oscillations of shaft 20 around axis 19 and also add to the precessional action of the shaft 20.

The instant described structure comprises an improvement and refinement over such structures as shown in my co-pending U. S. Patent 2,684,722, issued July 27, 1954 and is particularly directed to the development of the control ring 28 for automatically changing the pitch of the blades at certain circumferential position of rotation of the blades about the axis 11 of the drive shaft 10.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In a helicopter rotor structure, a drive shaft rotatable about a vertical axis, a transverse shaft, having an axis radially disposed relative to said vertical drive shaft axis, pivotally mounted on said drive shaft to rock about a radially disposed axis at right angles to the axis of said transverse shaft, a first ring around said drive shaft mounted at diametrically opposite positions on said transverse shaft, rigid control rod means pivotally connected to said first ring on an axis at right angles to and intersecting the axis of said transverse shaft operable to rock said ring about the axis of said transverse shaft, said last mentioned means including an inner control ring rigidly secured to said control rod means so that said inner control ring rotates with said first ring and said drive shaft, an outer control ring, anti-friction bearing means between said inner and outer control rings, a control lever fixed to outer control ring, an operating handle under pilot control operable to tilt said outer and inner control rings and said first ring to effect cyclic control of said rotor structure, hinge members pivotally mounted on said transverse shaft to swing about the axis thereof, and rotor blades mounted on said hinge members with said blades located above the plane of rotation of the axis of said transverse shaft and with the longitudinal axes of said blades angularly disposed relative to said axis of said transverse shaft.

2. In a helicopter rotor structure, a drive shaft rotatable about a vertical axis, a transverse shaft, having an axis radially disposed relative to vertical drive shaft axis, pivotally mounted on said drive shaft to rock about a radially disposed axis at right angles to and intersecting the axis of said transverse shaft, a first ring around said drive shaft mounted at diametrically opposite positions on said transverse shaft, rigid control rod means pivotally connected to said first ring on an axis at right angles to and intersecting the axis of said transverse shaft operable to rock said ring about the axis of said transverse shaft, hinge members pivotally mounted on said transverse shaft to swing about the axis thereof, and rotor blades mounted on said hinge members with said blades located above the plane of rotation of the axis of said transverse shaft and with the longitudinal axes of said blades angularly disposed relative to said axis of said transverse shaft.

3. In a helicoper rotor structure, a drive shaft rotatable about a vertical axis, a transverse shaft having an axis radially disposed relative to said vertical drive shaft axis and pivotally mounted on said drive shaft to rock about a radially disposed axis at right angles to and intersecting the axis of said transverse shaft, a first ring around said drive shaft mounted at diametrically opposite positions on said transverse shaft, pilot operated cyclic control means pivotally connected to said first ring on an axis at right angles to and intersecting the axis of said transverse shaft operable to directly rock said first ring and said transverse shaft on said drive shaft, hinge members pivotally mounted on said transverse shaft to swing about the axis thereof, rotor blades mounted on said hinge members with said blades located above the plane of rotation of the axis of said transverse shaft and with the longitudinal axes of said blades angularly disposed relative to said axis of said transverse shaft, a radially disposed yoke pivotally and axially slidably mounted on said drive shaft, yielding resilient means interconnected between the outer ends of said yoke and said hinge members, and means for axially shifting said yoke on said drive shaft to effect collective pitch control of said rotor blades.

4. In a helicopter rotor structure, a drive shaft rotatable about a vertical axis, a transverse shaft having an axis radially disposed relative to said vertical drive shaft axis and pivotally mounted on said drive shaft to rock about a radially disposed axis at right angles to and intersecting the axis of said transverse shaft, a first ring around said drive shaft mounted at diametrically opposite positions on said transverse shaft, pilot operated cyclic control means pivotally connected to said ring on an axis at right angles to and intersecting the axis of said transverse shaft operable to directly rock said first ring about the axis of said transverse shaft, hinge members pivotally mounted on said transverse shaft to swing about the axis thereof, rotor blades mounted on said hinge members with said blades located above the plane of rotation of the axis of said transverse shaft and with the longitudinal axes of said blades angularly disposed relative to said axis of said transverse shaft, a radially disposed yoke pivotally and axially slidably mounted on said drive shaft, yielding resilient means interconnected between the outer ends of said yoke and said hinge members, means for axially shifting said yoke on said drive shaft to effect collective pitch control of said rotor blades, said last mentioned means including a yoke support member slidable axially of said drive shaft, means for pivotally mounting a radially disposed yoke on said yoke support member, an inner shifter ring rotatably and slidably mounted on said drive shaft, control rods rigidly interconnecting said yoke support member and said inner shifter ring, an outer shifter ring, anti-friction bearing means between said inner and outer shifter rings, a control arm fixed to said outer shifter ring, and a control lever on said control arm on said outer shifter ring under pilot control to axially shift said yoke to effect climb or drive of the helicopter.

5. A helicopter rotor structure comprising, a drive shaft having a vertical axis of rotation, a transverse shaft having a radially disposed axis intersecting said vertical drive shaft axis, a ring mounted on said shaft at diametrically opposite positions thereof adapted to rock about the axis of said transverse shaft, means for mounting said transverse shaft on said drive shaft having an axis of rocking movement on said drive shaft at right angles to the axis of said transverse shaft and at right angles to the axis of said drive shaft and passing the point of intersection of said transverse and drive shaft axes, a cyclic control lever, means connecting said cyclic control lever to said ring including means having an axis of rocking movement on said ring positioned diametrically at right angles to the axis of said transverse shaft and passing through the common point of intersection of all of said aforementioned axes, wing supporting hinge means mounted on and adapted to rock about the axis of said transverse shaft, upstanding support means on said hinge means located rearwardly of the axis of said transverse shaft relative to the direction of rotation of said rotor, and means for securing rotor blade on said support means so that said blades travel in a disc of rotation above the disc of rotation defined by the axis of said transverse shaft and with blade axes angularly disposed relative to the axis of said transverse shaft.

6. A helicopter rotor structure comprising, a drive shaft having a vertical axis of rotation, a transverse shaft having a radially disposed axis intersecting said vertical drive shaft axis, a ring mounted on said shaft at diametrically opposite positions thereof adapted to rock about the axis of said transverse shaft, means for mounting said transverse shaft on said drive shaft having an axis of rocking movement on said drive shaft at right angles to the axis of said transverse shaft and at right angles to the axis of said drive shaft and passing the point of intersection of said transverse and drive shaft axes, a cyclic control lever, means connecting said cyclic control lever to said ring including means having an axis of rocking movement on said ring positioned diametrically at right angles to the axis of said transverse shaft and passing through the common point of intersection of all of said aforementioned axes, wing supporting hinge means mounted on and adapted to rock about the axis of said transverse shaft, upstanding support means on said hinge means located rearwardly of the axis of said transverse shaft relative to the direction of rotation of said rotor, means for securing rotor blades on said support means so that said blades travel in a disc of rotation above the disc of rotation defined by the axis of said transverse shaft and with blade axes angularly disposed relative to the axis of said transverse shaft, and collective pitch control means including a yoke, means rotatable with and vertically reciprocatable on said drive shaft, means for pivotally mounting said yoke on said last mentioned means to rock on an axis at right angles to said transverse shaft axis, and resilient connection between the outer ends of said yoke and said wing support hinge means for yielding simultaneously modifying the angle of attack of said blades during flight rotation.

7. A helicopter rotor structure including a drive shaft having a vertical axis of rotation, a transverse shaft having a longitudinal axis passing through the vertical axis of rotation of said drive shaft, means for pivotally supporting said transverse shaft on said drive shaft for tilting about an axis passing through the intersection of and located at right angles to said vertical drive shaft and transverse shaft axes and including journal bearing means for rocking of said transverse axis about its longitudinal axis, means connected to said transverse drive shaft for effecting said tilting and rocking movements thereof during the rotation of said drive shaft, blade supporting hinge members pivotally mounted on said transverse shaft to rock about the longitudinal axis thereof, rotor blades mounted on said hinge members having their longitudinal axes extending in angularly related direction to the axis of said transverse shaft and passing through a point of connection with said hinge members lying above the plane of rotation of said transverse shaft axis and behind said transverse axis relative to its direction of rotation, and counterweights on the outer ends of said transverse shaft.

8. A helicopter rotor structure including a drive shaft having a vertical axis of rotation, a transverse shaft having a longitudinal axis passing through the vertical axis of rotation of said drive shaft, means for pivotally supporting said transverse shaft on said drive shaft for tilting about an axis passing through the intersection of and located at right angles to said vertical drive shaft and transverse shaft axes and including journal bearing means for rocking of said transverse axis about its longitudinal axis, means connected to said transverse drive shaft for effecting said tilting and rocking movements thereof during the rotation of said drive shaft, blade supporting hinge members pivotally mounted on said transverse shaft to rock about the longitudinal axis thereof, rotor blades mounted on said hinge members having their longitudinal axes extending in angularly related direction to the axis of said transverse shaft and passing through a point of connection with said hinge members lying above the plane of rotation of said transverse shaft axis and behind said transverse axis relative to its direction of rotation, counterweights on the outer ends of said transverse shaft eccentrically mounted relative to the axis of said transverse shaft, a yoke pivotally mounted on said drive shaft having an axis of pivotal movement above and parallel to said transverse shaft axis, resilient means connecting the outer ends of said yoke to said hinge members to normally resiliently swing said hinge members upwardly and downwardly on said transverse shaft, and means for vertically reciprocating said yoke longitudinally of said drive shaft axis.

References Cited in the file of this patent

UNITED STATES PATENTS

| | | |
|---|---|---|
| 2,256,635 | Young | Sept. 23, 1941 |
| 2,368,698 | Young | Feb. 6, 1945 |
| 2,510,006 | Young | May 30, 1950 |
| 2,534,353 | Hiller et al. | Dec. 19, 1950 |
| 2,633,924 | Young | Apr. 7, 1953 |
| 2,684,122 | Perry | July 20, 1954 |
| 2,684,722 | Perry | July 27, 1954 |

FOREIGN PATENTS

| | | |
|---|---|---|
| 265,272 | Great Britain | Jan. 31, 1927 |
| 675,657 | Great Britain | July 16, 1952 |